United States Patent [19]

Mukohjima et al.

[11] Patent Number: 4,723,085
[45] Date of Patent: Feb. 2, 1988

[54] VIBRATION WAVE MOTOR

[75] Inventors: Hitoshi Mukohjima; Akira Hiramatsu, both of Yokohama, Japan

[73] Assignee: Canon Kabushiki Kaisha, Tokyo, Japan

[21] Appl. No.: 70,674

[22] Filed: Jul. 6, 1987

Related U.S. Application Data

[63] Continuation of Ser. No. 844,127, Mar. 26, 1986, abandoned.

[30] Foreign Application Priority Data

Mar. 29, 1985 [JP] Japan .................................. 60-65452

[51] Int. Cl.⁴ .............................................. H01L 41/08
[52] U.S. Cl. ...................................... 310/328; 310/358; 310/365; 310/366
[58] Field of Search ................ 310/323, 328, 357–359, 310/365, 366

[56] References Cited

U.S. PATENT DOCUMENTS

| | | | |
|---|---|---|---|
| 3,171,696 | 3/1965 | Houghton | 310/333 X |
| 4,019,073 | 4/1977 | Vishnevsky et al. | 310/333 X |
| 4,210,837 | 7/1980 | Vasiliev et al. | 310/333 X |
| 4,400,641 | 8/1983 | Vishnevsky et al. | 310/328 X |
| 4,484,099 | 11/1984 | Kawai et al. | 310/323 X |
| 4,491,401 | 1/1985 | Inaba et al. | 354/271.1 |
| 4,495,432 | 1/1985 | Katsuma et al. | 310/328 |
| 4,504,760 | 3/1985 | Yamamoto et al. | 310/323 |
| 4,510,411 | 4/1985 | Hakamata et al. | 310/323 |
| 4,513,219 | 4/1985 | Katsuma et al. | 310/328 |
| 4,560,263 | 12/1985 | Katsuma et al. | 310/323 X |
| 4,562,373 | 12/1985 | Tokusima et al. | 310/323 X |
| 4,562,374 | 12/1985 | Sashida | 310/323 X |
| 4,580,073 | 4/1986 | Okumura et al. | 310/323 |
| 4,645,964 | 2/1987 | Hiramatsu et al. | 310/323 |
| 4,649,311 | 3/1987 | Mukohjima et al. | 310/323 |
| 4,658,172 | 4/1987 | Izukawa | 310/323 |
| 4,678,956 | 7/1987 | Izukawa et al. | 310/323 |

FOREIGN PATENT DOCUMENTS

| | | | |
|---|---|---|---|
| 0670992 | 6/1979 | U.S.S.R. | 310/323 |
| 0803048 | 2/1981 | U.S.S.R. | 310/323 |

OTHER PUBLICATIONS

Piezoelectric Ceramic Transducers: Learn to use these Energy Transformers as a Connecting Link between Mechanical Equipment and Electronic Circuits, C. Edmiston, *Electronics Design*, 18, Sep. 1, 1974, pp. 78–82.

*Primary Examiner*—Mark O. Budd
*Attorney, Agent, or Firm*—Fitzpatrick, Cella, Harper & Scinto

[57] ABSTRACT

A vibration wave motor generates a travelling torsional vibration wave in a vibration member to drive a movable member.

4 Claims, 12 Drawing Figures

VIBRATION WAVE MOTOR

This application is a continuation of application Ser. No. 844,127, filed Mar. 26, 1986, now abandoned.

BACKGROUND OF THE INVENTION

1. Field of the Invention

The present invention relates to a structure of an actuator which utilizes a mechanical vibration wave generated by vibration generation means such as electro-mechanical energy transducer means including inter alia piezoelectric, electrostrictive and magnetostrictive devices.

2. Related Background Art

Of the actuators which utilize a mechanical vibration wave, a vibration wave motor or ultrasonic wave motor disclosed in Japanese Patent Application Laid-Open No. 29192/1977 has a stator and a movable member in friction contacted with the stator, and at least one of them is constructed by an electro-mechanical energy conversion device or an elastic vibration member containing the electro-mechanical energy conversion means. The movable member is frictionally driven in one direction by the mechanical vibration energy.

In such an ultrasonic wave motor, a vibration due to bending is generated in the vibration member and the movable member is driven by the bending vibration. Thus, when a drive frequency is in the ultrasonic wave range, a vibration mode has a high order and its amplitude is as small as several microns. When a large amplitude is required, the drive frequency goes to the audio frequency range. Since a piezo-electric device which is usually used as the electro-mechanical transducing device uses longitudinal vibration, an electro-mechanical coupling coefficient k is as small as 0.2–0.4 and a piezo-electric constant is as small as 100–300 ($\times 10^{-12}$ m/v). Thus, energy conversion efficiency is low.

SUMMARY OF THE INVENTION

It is an object of the present invention to provide an actuator which generates a torsional vibration in a frictional contact surface of a stator and a movable member which frictionally drives the movable member by an eliptical motion of a surface mass point due to the travelling torsional vibration so that drive in a low order mode with a drive frequency in a ultrasonic wave range and high energy conversion efficiency is attained.

Other objects of the present invention will be apparent from the following description of the invention.

DESCRIPTION OF THE PREFERRED EMBODIMENTS

When a vibration member of a vibration wave motor is a ring, a resonance frequency fi for vibrating the vibration member in a torsional mode is given by $$fi = \frac{1}{2\pi} \sqrt{\frac{E}{2p\gamma^2}} \cdot \sqrt{1 + i^2} \cdot \sqrt{\frac{Ix}{Ip}}$$

where
 E is a Young's modulus,
 p is the density of the ring vibration member,
 $\gamma$ is the center radius of the ring vibration member,
 i is an order of vibration,
 Ix is a secondary moment of a cross-sectional area with respect to a radial axis of the cross-sectional area, and
 Ip is a secondary moment of a cross-sectional area.

Figure 1:
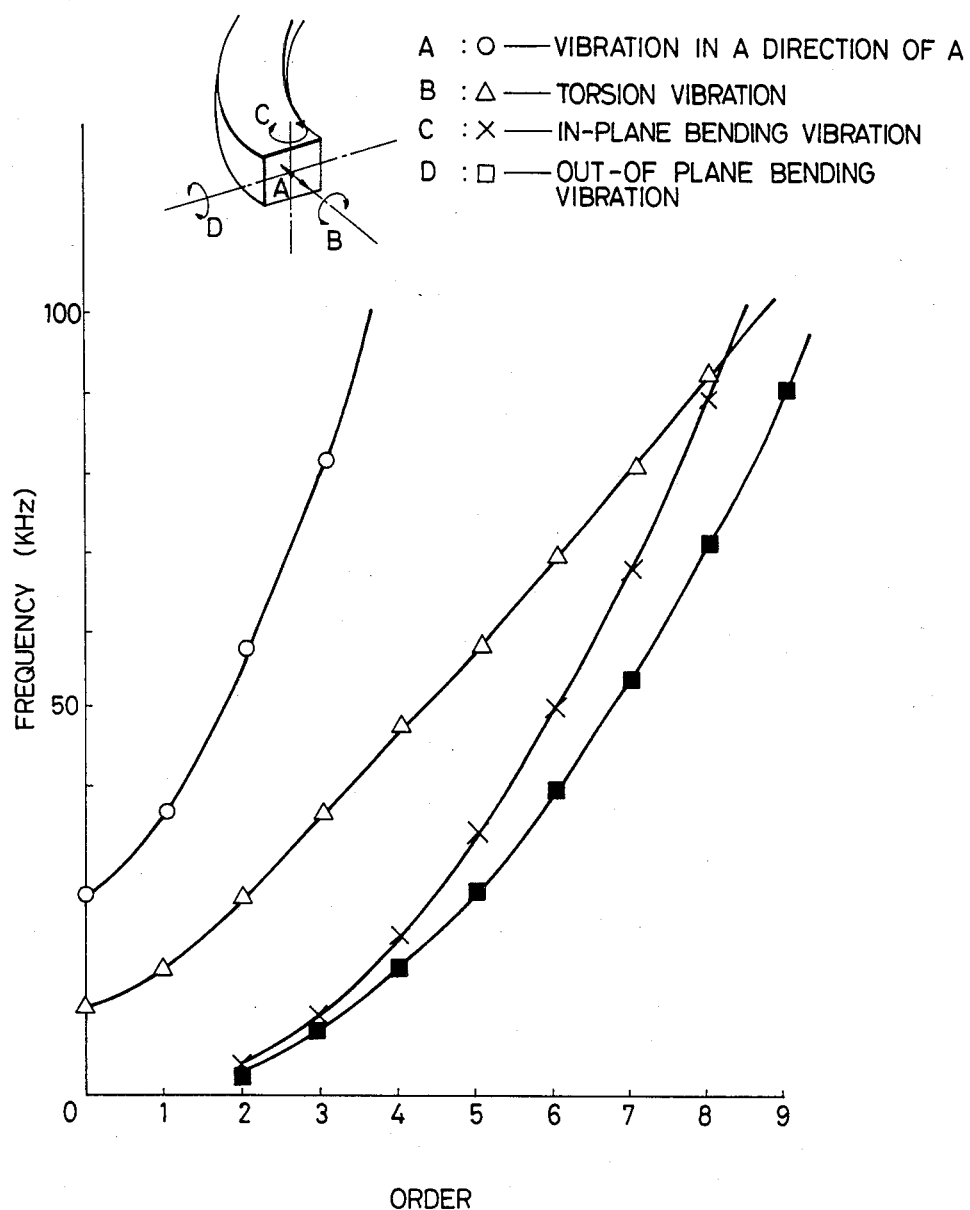
FIG. 1 shows characteristics of various vibration modes of a ring.

FIG. 1 shows resonance points for respective orders of vibration modes of the ring vibration member having a rectangular sectional area and an average radius of 4.1 cm. As seen from FIG. 1, a lower order mode of vibration can be utilized in the torsional vibration (i.e. vibration in a direction of arrow B in FIG. 1) than in a bending vibration.

Figure 2:
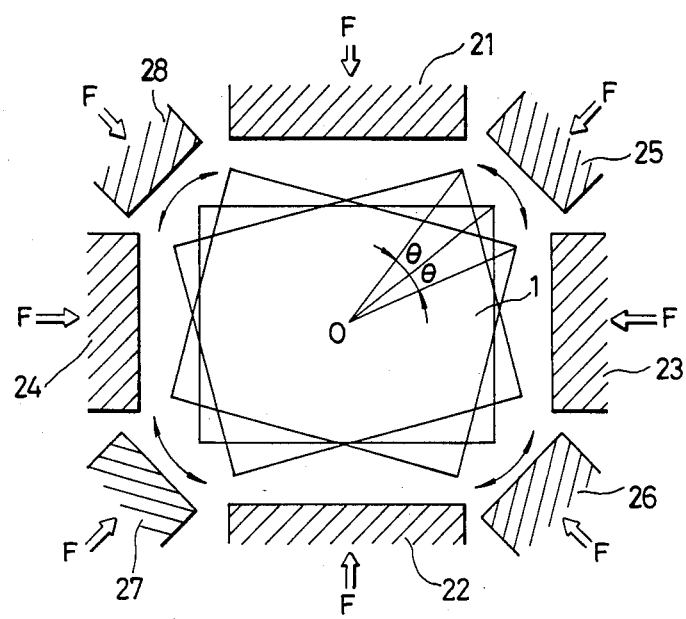
FIG. 2 illustrates a torsional vibration of a vibration member.

FIG. 2 illustrates the torsional vibration of the ring vibration member having a rectangular cross-section. The vibration member 1 generates a torsional vibration of $\pm \theta$ around a center of gravity O in the cross-section. The torsional wave which is axially generated is a standing wave, but a travelling wave is generated by combining standing waves having a phase difference of 90° in position with a phase difference of 90° in time.

Figure 3:
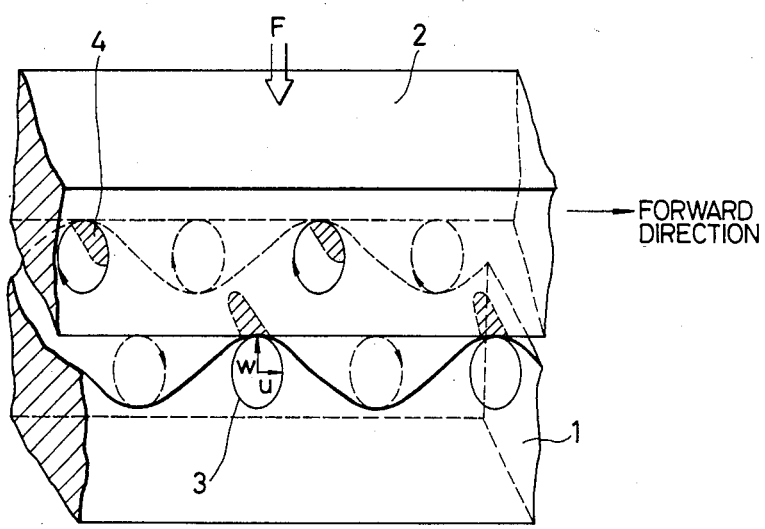
FIG. 3 illustrates an operation when a movable member is press-contacted to the vibration member.

In FIG. 3, the movable member 2 is press-contacted to the vibration member 1 in which the travelling wave is generated by the torsional vibration. The travelling wave is generated on the surface of the vibration member by the torsion formed by combining the torsional waves (standing waves), and a surface mass point makes an eliptical motion 3 of a lateral amplitude $\omega$ and a longitudinal amplitude v by the vibration wave. As the movable member 2 is press-contacted to the vibration member 1 with a load F, the movable member 2 is moved in a direction of movement of a mass point at an apex of the wave by a frictional force at the contact area 4 so that the movable member 2 is driven.

The travelling wave generated by the torsional vibration is generated over the entire circumference. When the movable member is press-contacted to the vibration member 1 as shown in FIG. 2, the entire circumference of the movable member 2, that is, the bottom, left, right and diagonal portions 21–28 can be used for driving the movable member.

Figure 4:
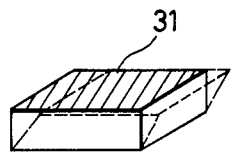
FIG. 4 illustrates a slip vibration of a piezo-electric device.

In order to generate the torsional vibration in the vibration member 1 by using the piezo-electric device, a slip vibration of the piezo-electric device 31 is used as shown in FIG. 4. For the slip vibration, the electro-mechanical coupling coefficient is as high as 0.6–0.8 and the piezo-electric constant is as high as 300–1000 $\times 10^{-12}$ m/v, and the energy conversion efficiency is 2.3 times as high as that of the longitudinal vibration.

Figure 5:
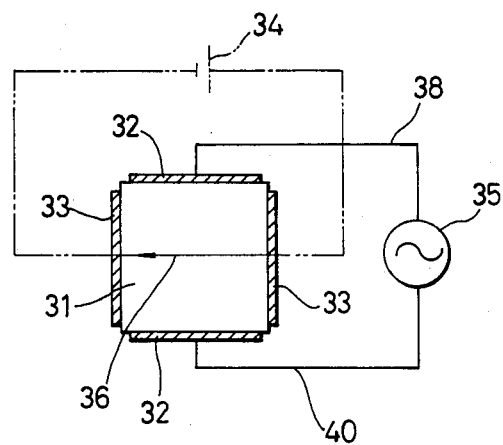
FIG. 5 illustrates polarization and drive of the piezo-electric device.

The piezo-electric device 31 of FIG. 4 is polarized in a direction of the arrow 36 shown in FIG. 5 by a polarization electrode 33 and a high voltage source 34 as shown by a double-dot chain line. A periodic voltage is applied by an AC power supply 35 to the polarized piezo-electric device 31 normally to the direction of polarization. Thus, the piezo-electric device is deformed as shown by a broken line in FIG. 4 and the piezo-electric device repeats the deformation to generate the slip vibration.

Figure 6:
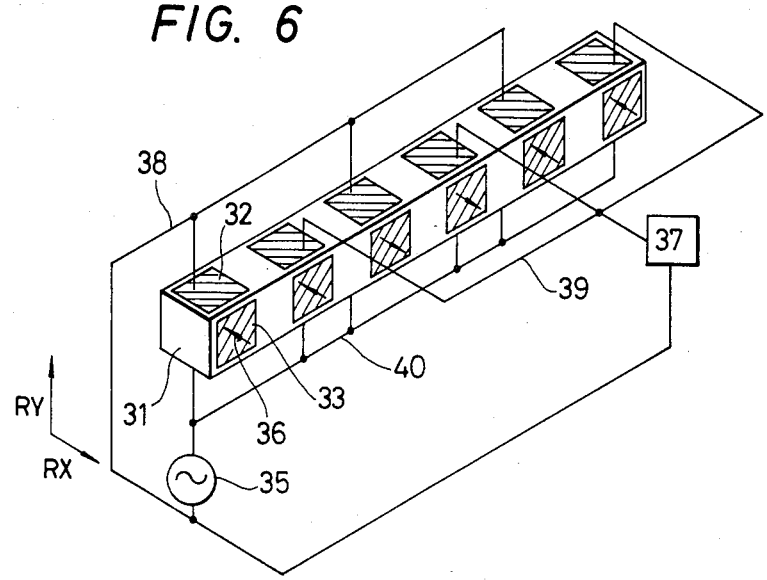
FIGS. 6 and 7 show vibration members applied to a linear motor and a rotary motor, respectively.

FIG. 6 shows a vibration member when the polarized piezo-electric device 31 shown in FIG. 5 is used for a linear motor. A voltage $V = V_0 \sin \omega t$ is applied to alternate ones of electrodes 32 through lead wires 38 and a voltage $V = V_0 \sin (\omega t \pm \pi/2)$ is applied to other alternate ones of the electrodes 32 through a phase shifter 37. In this arrangement, the slip vibration of FIG. 4 is generated and the torsional vibration travelling wave as shown in FIG. 3 is generated, and the movable member press-contacted to the piezo-electric device is driven. Thus, in accordance with the present invention, a vibration mode of the low order can be used and the slip vibration is utilized and the energy conversion efficiency is improved.

Figure 7:
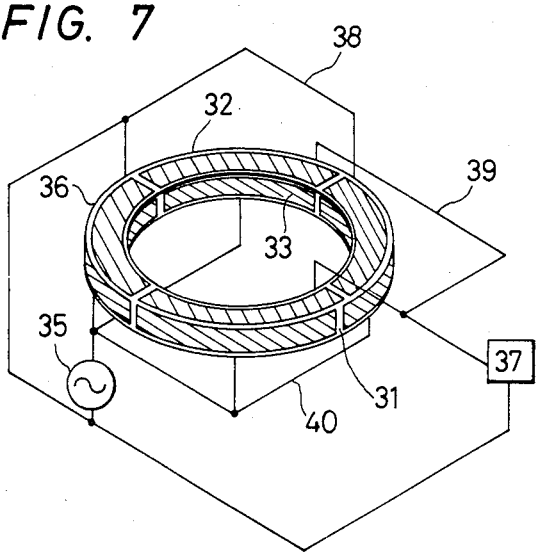

FIG. 7 shows a rotary vibration member constructed to rounding the vibration member of FIG. 6 in a direction RX. In FIG. 7, the torsional vibration travelling wave is generated as is done in FIG. 6, and the movable member is driven by press-contacting it to the vibration member. The same effect as that of FIG. 6 is attained in FIG. 7.

Because the torsional vibration is utilized, the construction of FIG. 7 in which the vibration member of FIG. 6 is rounded in the direction RX generates the travelling wave and a attains the same effect.

Figure 8A:
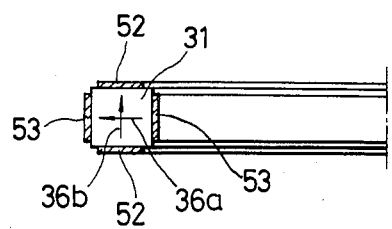
FIGS. 8A, 8B and 8C show sectional views of vibration members used for the rotary motor.

FIG. 8 shows sectional views of the rotary vibration member. Numerals 36a and 36b represent directions of polarization. In FIG. 8A, an electrode 53 is used as a polarization electrode and polarization occurs in a direction of arrow 36a (radially). When a driving periodic voltage is applied to an electrode 52, the rotary vibration member shown in FIG. 7 is formed. In FIG. 8A, if the electrode 52 is used as the polarization electrode, the polarization occurs in a direction of arrow 36b (axially), and when the driving periodic wave is applied to the electrode 53, the round-coupled vibration member is formed.

Figure 8B:
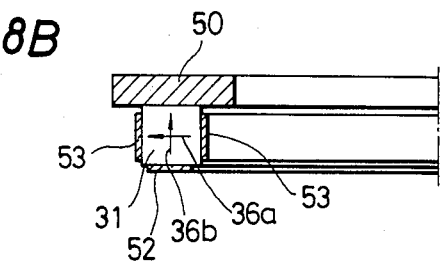

In FIG. 8B, an elastic member 50 is coupled to the piezo-electric device 31 in the arrangement shown in FIG. 8A.

Figure 8C:
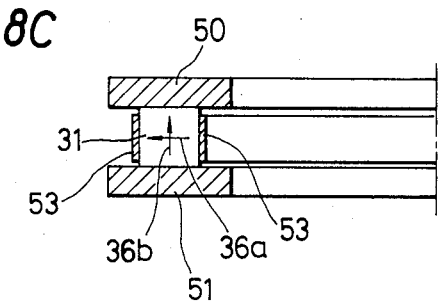

In FIG. 8C, two elastic members 50 and 51 are joined to the piezo-electric device 31 to form the vibration member.

The elastic members may be joined at the inner or outer periphery of the piezo-electric device.

Figure 9:
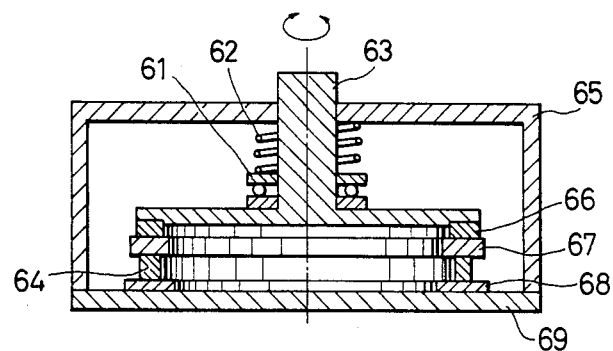
FIGS. 9 and 10 show sectional view and perspective view of a rotary motor which uses the vibration member of FIG. 8B.
Figure 10:
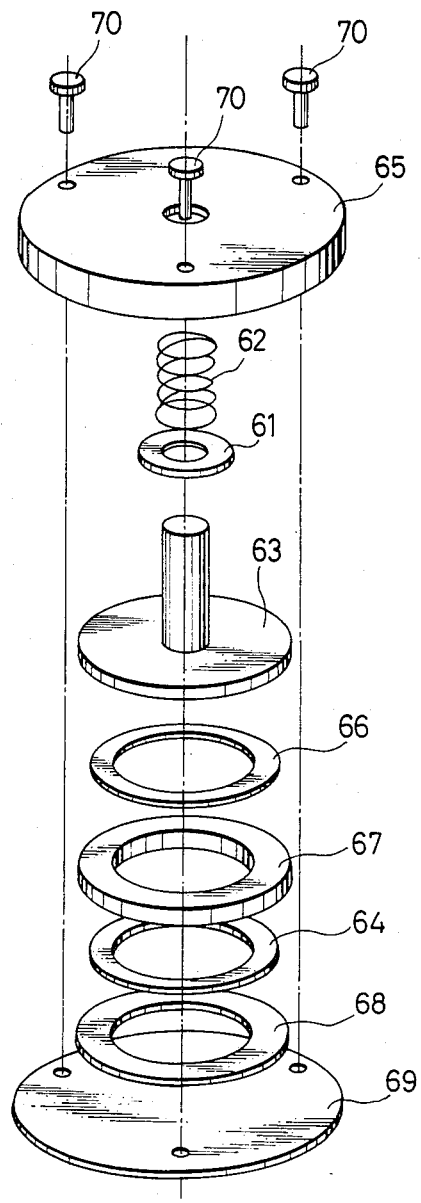

FIGS. 9 and 10 show a rotary motor which uses the vibration member of FIG. 8B. FIG. 9 shows a sectional view and FIG. 10 shows a perspective view. In FIGS. 9 and 10, numeral 67 denotes an elastic member primarily mode of metal, numeral 64 denotes a piezo-electric device joined to the elastic member 67, numeral 66 denotes a movable member which is press-contacted to the elastic member 67, numeral 68 denotes a rotating disc (rotary shaft), numeral 68 denotes a vibration absorbing member which supports the piezo-electric device 64, and numeral 69 denotes a fixed plate.

A periodic voltage is applied to the piezo-electric device 64 from an external power supply by the arrangement shown in FIG. 7 at a drive frequency which causes the vibration member consisting of the elastic member 67 and the piezo-electric device 64 to resonate. As a result, the travelling wave by the torsional vibration is generated in the vibration member. A frictional force acts on the movable member 66 which press-contacts the elastic member 67 by the spring 67 through a thrust bearing 61. The rotary shaft 63 joined to the movable member 66 is rotated by the drive by the movable member by the travelling wave. The fixed cover 65 is fixed to the fixed plate 69 by bolts 70. The vibration absorbing member 68 is inserted between the piezo-electric device 64 and the fixed plate 69 to prevent the ultrasonic vibration of the vibration member from being transmitted to the fixed plate 69. In the embodiment shown in FIGS. 9 and 10, the movable member is driven by the torsional vibration travelling wave by the slip vibration shown in FIG. 7. Accordingly, a high driving efficiency is attained with a low order vibration mode.

In the above embodiments, the piezo-electric device is used to excite the torsional vibration, although other electro-mechanical transducer devices such as electrostrictive or magnetostrictive device may be used or other excitation means may be used.

While the vibration member is the stator in the above embodiments, the vibration member may be the movable member to form the vibration wave motor by the torsional vibration.

While the vibration member has a rectangular cross-section in the above embodiment, it may have a circular cross-section or other shape.

As described hereinabove, since the present invention utilizes the torsional vibration, a lower order mode can be used than that for the bending vibration and a larger amplitude is obtained.

When the piezo-electric device is used, the slip vibration is utilized and the energy conversion efficiency is improved.

Further, since the travelling waves of the same direction and the same velocity are generated over the entire circumference, that is, the top, bottom, left, right and diagonal areas of the vibration member, the driving force is large and there is much freedom for packaging layout.

In the linear motor, the torsional vibration is utilized. Thus, the center of gravity of the vibration member can be supported so that the center of gravity of the two opposite ends of the vibration member can be fixed and supported.

We claim:

1. A vibration wave motor comprising:

an elastic member;

first and second groups of polarized piezo-electric elements, said groups being located at different positions of said elastic member, and each group comprising a plurality of piezo-electric elements;

periodic signal applying means for respectively applying periodic signals having phases different from each other to said first and second piezo-electric elements to form a travelling vibration wave, wherein the periodic signals are respectively applied to each said piezo-electric element in a direction perpendicular to the polarization of the element; and a movable member driven by said travelling vibration wave.

2. A vibration wave motor according to claim 1, wherein said plural piezo-electric elements are integrally formed as a unit.

3. A vibration wave motor according to claim 1, wherein said elastic member has an annular shape.

4. A vibration wave motor comprising:
a piezo-electric member, said piezo-electric member including first and second polarization portions which are located at different positions;
periodic signal applying means for respectively applying periodic signals having phases different from each other to said first and second polarization portions of said first and second piezo-electric elements to form a travelling vibration wave, wherein the periodic signals are respectively applied to each said piezo-electric element in a direction perpendicular to the polarization of the element; and
a movable member driven by said travelling vibration wave.

* * * * *

UNITED STATES PATENT AND TRADEMARK OFFICE
CERTIFICATE OF CORRECTION

PATENT NO. : 4,723,085

DATED : February 2, 1988

INVENTOR(S) : H. Mukohjima, et al.

It is certified that error appears in the above-identified patent and that said Letters Patent is hereby corrected as shown below:

COLUMN 1

Line 20, "contacted" should read --contact--.
    Line 46, "eliptical" should read --elliptical--.
    Line 48, "a" (second occurrence) should read --an--.

COLUMN 2

Line 45, "eliptical" should read --elliptical--.
    Line 45, "ω" should read --w--.
    Line 46, "v" should read --u--.
    Line 57, "the bottom," should read
        --the top, bottom,--.

COLUMN 3

Line 35, "a" should be deleted.
    Line 60, "mode" should read --made--.
    Line 62, "numeral 68" should read --
        --numeral 63--.

UNITED STATES PATENT AND TRADEMARK OFFICE
CERTIFICATE OF CORRECTION

PATENT NO. : 4,723,085

DATED : February 2, 1988

INVENTOR(S) : H. Mukohjima, et al

It is certified that error appears in the above-identified patent and that said Letters Patent is hereby corrected as shown below:

Column 4, line 7, "spring 67" should read -- spring 62 --.

Signed and Sealed this

Thirtieth Day of August, 1988

Attest:

DONALD J. QUIGG

*Attesting Officer*    *Commissioner of Patents and Trademarks*